Dec. 10, 1963 J. BUDNIK 3,113,799
JAR HOLDER
Filed Nov. 17, 1961
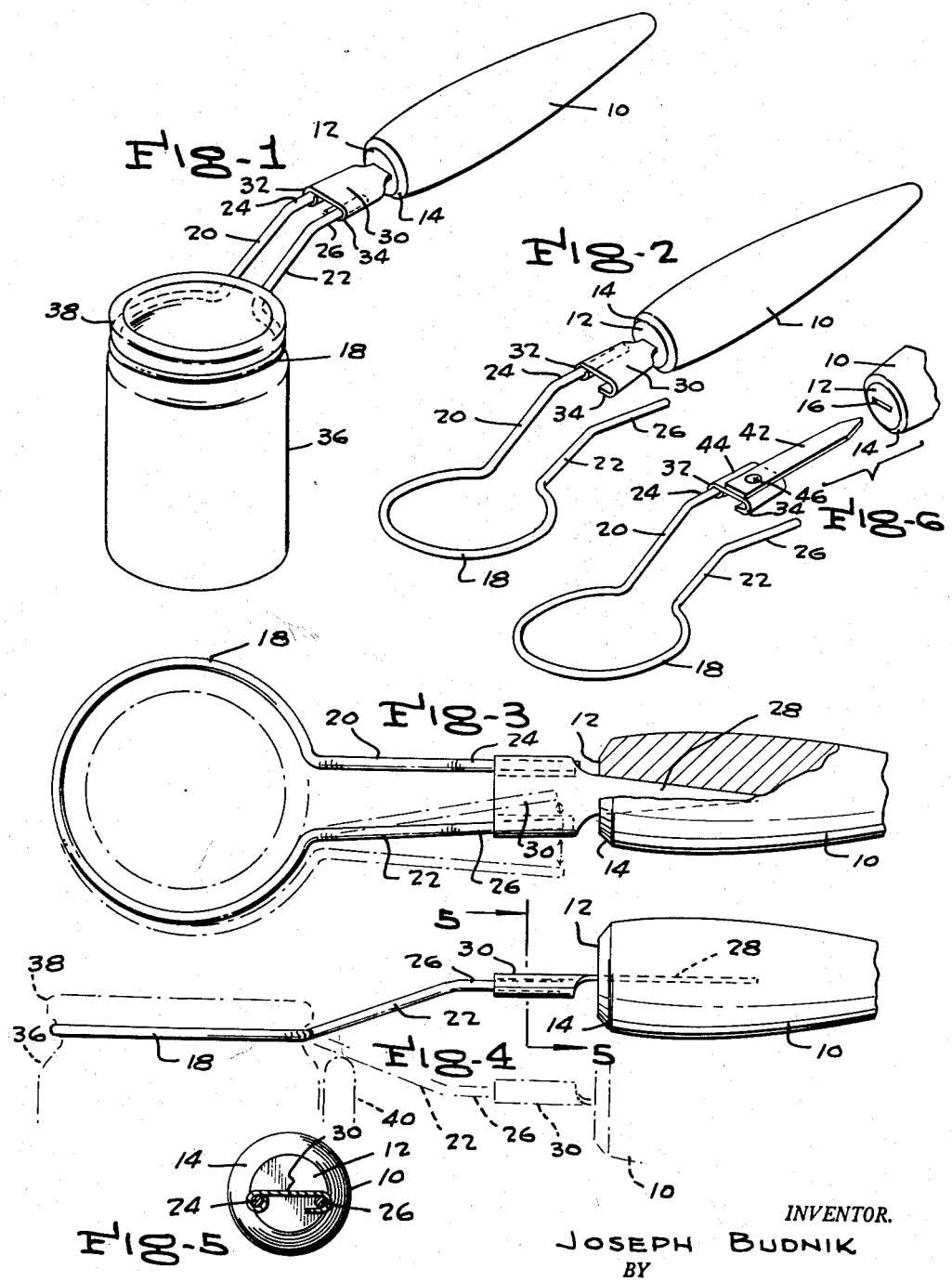
INVENTOR.
JOSEPH BUDNIK
BY
McMorrow, Berman & Davidson
ATTORNEYS

United States Patent Office 3,113,799
Patented Dec. 10, 1963

3,113,799
JAR HOLDER
Joseph Budnik, 6 Gloria St., Seymour, Conn.
Filed Nov. 17, 1961, Ser. No. 153,035
3 Claims. (Cl. 294—31.2)

This invention relates to holders for jars or the like, and in particular to a device adapted to be looped around the groove or neck of a container, for lifting and handling without manual contact with the container.

Glass containers holding foodstuffs are frequently warmed or heated in the original container, and their subsequent handling involves a problem, since the nature of the operation is not conducive to the use of a heat-insulating pad. Therefore, a mechanical lifter and holder is preferable, and it is a general object of the invention to provide an improved form of mechanical holder.

More particularly, it is an object to provide a holder with a jar-engaging loop, adapted to open, for spreading, to engage a jar groove. In still greater particular, it is an object to provide a holder having a heat-insulating handle, to which is secured a latching device for holding the openable loop in closed condition. Yet another object is to provide a holder which also serves to suspend a jar from the rim of a heating vessel.

These and other objects, which will be readily apparent, are attained by the present invention, a preferred form of which is described in the following specification, as illustrated in the drawing, in which:

FIGURE 1 is a perspective view of one form of the holder, in engagement with a jar, FIGURE 2 is a view similar to FIGURE 1, with jar omitted, and showing the loop of the holder open and expanded, FIGURE 3 is a top plan view of the holder of FIGURE 1, showing adjusted positions of these loops in broken lines, FIGURE 4 is a side elevational view of the holder of FIGURE 3, showing an inverted position of use of the holder in broken lines, FIGURE 5 is a sectional view taken along the line 5—5 of FIGURE 4, and FIGURE 6 is a bracketed view similar to FIGURE 2, showing a modified form of the tool, and with the handle separated.

Referring to the drawings by characters of reference, there is shown a holder according to the invention, comprising a handle 10 of elongate, ogival form, with a flat, inner, circular end face 12, having a beveled, peripheral edge 14, and provided with a radially disposed, central slot 16, for anchoring the outer end of the tool proper. The latter comprises a length of stiff, spring wire, bent in its midportion to form a circular loop 18, of less than 360°, with two straight sections 20, 22, of the wire, at the ends of the loop, bent radially outwardly from the loop, as well as at an oblique angle to the plane thereof, and with the two straight terminal ends 24, 26 of the wire bent into general parallelism with the plane of the loop.

The connecting element between the handle and the ends of the loop wire comprises a flat pointed stake 28, adapted to be received in slot 16 and driven into a force fit, as in the case of chisels, files and other like tools. The slot 16 will, of course, roughly correspond in size and shape to the stake 28, so as to avoid splitting of the handle. If deemed necessary or desirable, a ferrule may be provided on the handle.

For securing the wire ends, the connecting element includes a widened portion 30 on the outer end of stake 28, the outer edges of this portion having reversely folded portions forming loops or sleeves 32, 34, sized to snugly receive the wire ends 24, 26, respectively. The wire end 24 is permanently fixed in the loop 32, as by soldering, welding, or staking, and consequently this loop has its inner end upwardly folded, to encompass the wire, whereas loop 34 is bent only through 180°, to constitute a split sleeve, so that the wire end 26 may be slipped in or out, as required.

As seen in FIGURE 2, when the wire is in its normal, unstressed condition, wire end 26 is spread away from the loop 34 of the anchor means 30, and for adjustment to the working position, the end 26 is forced toward end 24, against the spring pressure, past the loop 34, and moved to engagement within the loop 34, where it is held by the natural spring pressure. When an object is held within the main loop 18, the force necessary to overcome the spring pressure is greater.

In the example of use shown in FIGURE 1, the loop 18 is shown engaged in the neck of a glass jar 36, just below the rim 38 of the jar opening. Thus engaged, the loop is capable of supporting the weight of the jar, so that it may be lowered into hot water, lifted therefrom, transported, or manipulated for pouring, or other manner of dispensing. When the support is no longer needed, the tool is simply removed by flipping the wire end 26 out of engagement with the holding loop 34.

The slant sections 20, 22 in the wires increase the distance to which the jar may be lowered into a kettle without undue tilting. These also provide a further useful function, as illustrated in the broken lines in FIGURE 4, wherein the position of the tool, when engaging the jar, is inverted with respect to the position shown in the full lines, and the wire sections 20, 22, which in this case slant downward, away from the loop, constitute a hook for hanging the assembly on the rim of a kettle 40, thus removing the jar from the damaging action of heat and bumping which it would encounter if resting on the bottom of the kettle.

In FIGURE 6 is shown a modification wherein the connector is made of two separate parts, a stake 42 and a loop-bearing section 44, the two being connected as by a rivet 46, and/or soldering or welding. This form enables fabrication from straps out from lengths of sheet stock, without undue waste in the form of scrap, and avoids complicated stamping.

The device is useful in handling food jars, especially baby food jars, whether hot or cold, and also in home canning operations. Among the uses may also be included the handling of laboratory beakers, test tubes, and other implements. Generally speaking, it will find useful employment with containers in a variety of shapes and in many arts, the only requirement being that they have a lip or other prominence behind which the loop can engage.

The flexibility of the device is such as to accommodate a reasonable range of sizes of objects, and this may be extended considerably by providing the tools in two or more sizes.

Conventionally, the handle may be of wood, with enamel overlay, or it may be molded from plastic material, with the stake 28, or equivalent, thoroughly anchored therein during the molding process.

In general, although a preferred embodiment has ben shown for purposes of illustration, various modifications will be apparent, in the light of this disclosure, and the invention should not, therefore, be deemed as limited, except insofar as shall appear from the spirit and scope of the appended claims.

I claim:

1. A handling device for jars and the like, comprising a handle, a stake embedded in an end of said handle, generally axially thereof, and having an enlarged, sheet-form, outer portion with reversely folded sides, constituting sleeves, and a jar-gripping implement carried by said outer portion, and comprising a length of wire having a central, circular looped portion, with spaced, terminal ends, a straight intermediate portion extending from each of said ends, radially of said looped portion and at an oblique angle to the plane thereof, and a straight terminal portion extending from the ends of each of said intermediate portions and generally parallel to the plane of said loop, one of said terminal portions being fixedly received in one of said sleeves, and the other of said terminal portions normally lying outwardly of the other of said sleeves, but engageable therewith upon flexure of said wire.

2. A device as in claim 1, said stake and said outer portion comprising separate elements of sheet stock, secured together in transverse relation.

3. A handling device for jars and the like, comprising a handle, a stake embedded in an end of said handle, and having an enlarged, outer portion with reversely folded sides, constituting sleeves, and a jar-gripping implement carried by said outer portion and comprising a length of wire having a medial looped portion with spaced, terminal ends, a straight intermediate portion extending from each of said ends at an oblique angle to the plane of said looped portion, and a straight terminal portion extending from the ends of each of said intermediate portions and generally parallel to the plane of said loop, one of said terminal portions being fixedly received in one of said sleeves, and the other of said terminal portions normally lying outwardly of the other of said sleeves, but engageable therewith upon flexure of said wire.

References Cited in the file of this patent

UNITED STATES PATENTS

| | | |
|---|---|---|
| 123,498 | McDonald | Feb. 6, 1872 |
| 1,575,576 | Guitian | Mar. 2, 1926 |
| 1,598,536 | List | Aug. 31, 1926 |
| 1,768,311 | Fahrnkopf | June 24, 1930 |